US012719881B2

(12) United States Patent
Kovacs et al.

(10) Patent No.: US 12,719,881 B2
(45) **Date of Patent: *Aug. 25, 2026**

(54) NETWORK OF NETWORKS

(71) Applicant: Stripe, LLC, South San Francisco, CA (US)

(72) Inventors: Michael Julien Kovacs, Mississauga (CA); Bowen Pan, Belmont, CA (US); Gabriel Hurley, Oakland, CA (US); Dmitriy Gak, Seattle, WA (US); Timothy James Fontaine, San Francisco, CA (US); Yuliya Gorlovetsky, Portola Valley, CA (US); Mark Joseph Cavage, Kensington, CA (US); Brian Amaro, Mississauga (CA)

(73) Assignee: Stripe, LLC, South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/799,991

(22) Filed: Aug. 9, 2024

(65) Prior Publication Data

US 2024/0406185 A1 Dec. 5, 2024

Related U.S. Application Data

(63) Continuation of application No. 18/094,290, filed on Jan. 6, 2023, now Pat. No. 12,095,773.

(51) Int. Cl.
*H04L 9/40* (2022.01)
*H04L 67/53* (2022.01)

(52) U.S. Cl.
CPC ........ *H04L 63/105* (2013.01); *H04L 63/0884* (2013.01); *H04L 67/53* (2022.05)

(58) Field of Classification Search
CPC ... H04L 67/53; H04L 67/0884; H04L 63/105; H04L 63/0884; G06F 8/36
(Continued)

(56) References Cited

U.S. PATENT DOCUMENTS 8,732,475 B2 * 5/2014 Fahrny .................. H04L 63/105 726/16
8,756,617 B1 6/2014 Boodman
(Continued)

FOREIGN PATENT DOCUMENTS

CA 3128629 A1 * 7/2016 ............... G06N 5/01
CA 3071669 2/2019
(Continued)

OTHER PUBLICATIONS

U.S. Appl. No. 18/094,184; Final Office Action dated May 6, 2025, 29 pages.
(Continued)

*Primary Examiner* — Khanh Q Dinh
(74) *Attorney, Agent, or Firm* — BAKERHOSTETLER

(57) ABSTRACT

In some embodiments, a computer system is described. In some embodiments, the computer system generates a suggested collection of applications based at least in part on a first application selected by a client device, receives a second selection of a second application from the suggested collection of applications, integrates the first application and second application with a client application on the host platform, receives a request to perform an operation on the client application, selects at least one of the first application or the second application of the client application to perform the operation based on a determination that the at least one of the first application or the second application have access to the database, sends a request to perform the operation to
(Continued)

the selected first or second application, and receives a set of results based on performance of the operation.

20 Claims, 10 Drawing Sheets

(58) Field of Classification Search
USPC .......................................... 709/220, 224–229
See application file for complete search history.

(56) References Cited

U.S. PATENT DOCUMENTS

| | | | | |
|---|---|---|---|---|
| 8,914,358 | B1 | 12/2014 | Pearson | |
| 9,110,577 | B1 | 8/2015 | Alur et al. | |
| 9,123,063 | B2 * | 9/2015 | Setton | G06Q 30/0276 |
| 9,442,832 | B2 | 9/2016 | Bharara | |
| 9,979,712 | B2 * | 5/2018 | Bhimanaik | G06F 21/335 |
| 10,171,447 | B2 * | 1/2019 | Rykowski | G06F 21/44 |
| 10,171,448 | B2 * | 1/2019 | Rykowski | G06F 21/41 |
| 10,715,315 | B1 * | 7/2020 | Proctor | H04L 9/3213 |
| 10,880,312 | B1 * | 12/2020 | Mesard | H04L 63/083 |
| 11,023,261 | B1 | 6/2021 | Jensen | |
| 11,061,976 | B1 | 7/2021 | Brody | |
| 11,070,646 | B1 | 7/2021 | Lingafelt | |
| 11,107,580 | B1 | 8/2021 | Felton | |
| 11,245,744 | B1 | 2/2022 | Brevoort et al. | |
| 11,289,200 | B1 | 3/2022 | Gregg | |
| 11,444,903 | B1 | 9/2022 | Brevoort et al. | |
| 11,455,166 | B2 | 9/2022 | Brevoort et al. | |
| 11,558,453 | B2 | 1/2023 | Brevoort et al. | |
| 12,095,773 | B2 * | 9/2024 | Kovacs | H04L 63/105 |
| 2005/0021405 | A1 | 1/2005 | Agarwal | |
| 2007/0028043 | A1 | 2/2007 | Jantz | |
| 2007/0201654 | A1 | 8/2007 | Shenfield | |
| 2009/0182565 | A1 | 7/2009 | Erickson | |
| 2012/0102485 | A1 | 4/2012 | Goldman | |
| 2012/0159572 | A1 | 6/2012 | Patel | |
| 2012/0215798 | A1 | 8/2012 | Burris | |
| 2013/0232485 | A1 | 9/2013 | Murray | |
| 2015/0172292 | A1 * | 6/2015 | Kuang | H04L 63/0884 713/155 |
| 2015/0324594 | A1 * | 11/2015 | Arrelid | G06Q 20/1235 726/27 |
| 2016/0087970 | A1 * | 3/2016 | Kahol | H04L 67/56 726/8 |
| 2016/0234209 | A1 * | 8/2016 | Kahol | G06F 21/305 |
| 2016/0335058 | A1 | 11/2016 | Weckwerth | |
| 2016/0344719 | A1 * | 11/2016 | Simone | H04L 63/08 |
| 2017/0126696 | A1 * | 5/2017 | Duffell | H04L 63/0876 |
| 2017/0235559 | A1 | 8/2017 | Saenz | |
| 2018/0083941 | A1 * | 3/2018 | Thakkar | H04L 63/08 |
| 2018/0124051 | A1 * | 5/2018 | Wang | H04L 63/105 |
| 2018/0143949 | A1 | 5/2018 | Stachowicz | |
| 2018/0211055 | A1 * | 7/2018 | Balijepalli | H04L 9/0819 |
| 2018/0276053 | A1 * | 9/2018 | Kesavan | H04L 67/53 |
| 2019/0265884 | A1 | 8/2019 | Penilla | |
| 2019/0332808 | A1 * | 10/2019 | Dunjic | G06F 21/6263 |
| 2019/0377832 | A1 | 12/2019 | McLean | |
| 2020/0019414 | A1 | 1/2020 | Byard | |
| 2020/0204574 | A1 | 6/2020 | Christian | |
| 2020/0259852 | A1 | 8/2020 | Wolff | |
| 2021/0036994 | A1 | 2/2021 | Samayavel | |
| 2021/0084040 | A1 * | 3/2021 | Sakowicz | H04L 63/1425 |
| 2021/0149688 | A1 | 5/2021 | Newell et al. | |
| 2021/0152541 | A1 | 5/2021 | Caldwell | |
| 2022/0060523 | A1 | 2/2022 | Brevoort et al. | |
| 2022/0114267 | A1 | 4/2022 | Schwartz | |
| 2022/0245557 | A1 | 8/2022 | Minter | |
| 2022/0414526 | A1 | 12/2022 | Darrah | |
| 2023/0081429 | A1 | 3/2023 | Babtkis | |
| 2023/0123496 | A1 | 4/2023 | David | |

FOREIGN PATENT DOCUMENTS

| | | | |
|---|---|---|---|
| CA | 2982062 | A1 | 4/2019 |
| CN | 100422939 | C | 10/2008 |

OTHER PUBLICATIONS

Asgarnezhad, et al., "Analysis and Evaluation of Two Security Services in SOA," IEEE 5th International Conference on Internet and Web Applications and Services (ICIW), May 2010, pp. 562-568.

Ranchal, et al., "Privacy Preserving Access Control in Service-Oriented Architecture," IEEE International Conference on Web Services (ICWS), Jun. 2016, pp. 412-419.

Seffah et al., "Multiple User Interfaces Cross-Platform Applications and Context-Aware Interfaces," 2004. retrieved from https://onlinelibrary.wiley.com/doi/pdf/10.1002/0470091703#page=28, 395 pages.

International Search Report and Written Opinion from PCT/US2024/010766, dated Apr. 15, 2024, 16 pages.

Notice of Allowance from U.S. Appl. No. 18/094,281, dated Jun. 6, 2024, 11 pages.

Notice of Allowance from U.S. Appl. No. 18/094,286, dated Jul. 9, 2024, 13 pages.

Notice of Allowance from U.S. Appl. No. 18/094,289, dated Jun. 12, 2024, 21 pages.

Notice of Allowance from U.S. Appl. No. 18/094,290, dated Aug. 7, 2024, 9 pages.

Notice of Allowance from U.S. Appl. No. 18/094,290, dated May 16, 2024, 17 pages.

* cited by examiner

NETWORK OF NETWORKS

CROSS REFERENCE TO RELATED APPLICATIONS

This application is a continuation of U.S. patent application Ser. No. 18/094,290, entitled "NETWORK OF NETWORKS," filed on Jan. 6, 2023, which is hereby incorporated by reference in its entirety.

TECHNICAL FIELD

The disclosure generally relates to software development.

BACKGROUND

Software developers often enable an application to perform a task that another software developer has previously enabled another application to perform. To enable the application to perform the task, software developers often write computer code that another developer has already written that performs similar functionality. Thus, it is often more efficient for a software developer to be able to easily find and reuse previously developed computer code.

SUMMARY

Software developers often need to find applications that have been previously developed and incorporate functionality from these applications to save time from re-developing the functionality provided by these applications. However, incorporating functionality of multiple applications from different developers can require a large amount of time and/or resources, and can require providing permission to data to third parties such that there is an increase in security and privacy risk. This disclosure is directed to a network, where a software developer can leverage functionality of an application and/or other components (e.g., steps of a workflow, UI extensions, etc.) to work as a part of a system that the software developer is building. In some embodiments, the software developer needs to have access to data associated with the application and/or other components of the application to be able to leverage the functionality of the application and/or other components. In some embodiments, the network can manage various access rights and/or permissions for software developers to give (or not give) a respective software developer the ability to use and/or access data corresponding to the application and/or other components of the application based on the access rights associated with the particular developer.

In some embodiments, a method that is performed by a computer system is described. In some embodiments, the method comprises: receiving, from a client application, a first request to access a collection of applications associated with an operation, wherein the collection of applications is associated with at least one third-party entity; receiving a selection of an application associated with a third-party entity from the collection of applications; in response to receiving the selection, identifying a set of data comprising an aggregation of data stored on a plurality of databases required to perform the operation associated with the application; determining that the application has access to the aggregation of data; sending a request to perform the operation to the application; and receiving a set of results based on the performance of the operation.

In some embodiments, a non-transitory computer-readable storage medium storing one or more programs configured to be executed by one or more processors of a computer system is described. In some embodiments, the one or more programs includes instructions for: receiving, from a client application, a first request to access a collection of applications associated with an operation, wherein the collection of applications is associated with at least one third-party entity; receiving a selection of an application associated with a third-party entity from the collection of applications; in response to receiving the selection, identifying a set of data comprising an aggregation of data stored on a plurality of databases required to perform the operation associated with the application; determining that the application has access to the aggregation of data; sending a request to perform the operation to the application; and receiving a set of results based on the performance of the operation.

In some embodiments, a transitory computer-readable storage medium storing one or more programs configured to be executed by one or more processors of a computer system is described. In some embodiments, the one or more programs includes instructions for: receiving, from a client application, a first request to access a collection of applications associated with an operation, wherein the collection of applications is associated with at least one third-party entity; receiving a selection of an application associated with a third-party entity from the collection of applications; in response to receiving the selection, identifying a set of data comprising an aggregation of data stored on a plurality of databases required to perform the operation associated with the application; determining that the application has access to the aggregation of data; sending a request to perform the operation to the application; and receiving a set of results based on the performance of the operation.

In some embodiments, a computer system is described. In some embodiments, the computer system comprises one or more processors and memory storing one or more program configured to be executed by the one or more processors. In some embodiments, the one or more programs includes instructions for: receiving, from a client application, a first request to access a collection of applications associated with an operation, wherein the collection of applications is associated with at least one third-party entity; receiving a selection of an application associated with a third-party entity from the collection of applications; in response to receiving the selection, identifying a set of data comprising an aggregation of data stored on a plurality of databases required to perform the operation associated with the application; determining that the application has access to the aggregation of data; sending a request to perform the operation to the application; and receiving a set of results based on the performance of the operation.

In some embodiments, a computer system is described. In some embodiments, the computer system includes: means for receiving, from a client application, a first request to access a collection of applications associated with an operation, wherein the collection of applications is associated with at least one third-party entity; means for receiving a selection of an application associated with a third-party entity from the collection of applications; means, responsive to receiving the selection, for identifying a set of data comprising an aggregation of data stored on a plurality of databases required to perform the operation associated with the application; determining that the application has access to the aggregation of data; means for sending a request to perform the operation to the application; and means for receiving a set of results based on the performance of the operation.

In some embodiments, a computer program product is described. In some embodiments, the computer program product comprises one or more programs configured to be executed by one or more processors of a computer system. In some embodiments, the one or more programs includes instructions for: receiving, from a client application, a first request to access a collection of applications associated with an operation, wherein the collection of applications is associated with at least one third-party entity; receiving a selection of an application associated with a third-party entity from the collection of applications; in response to receiving the selection, identifying a set of data comprising an aggregation of data stored on a plurality of databases required to perform the operation associated with the application; determining that the application has access to the aggregation of data; sending a request to perform the operation to the application; and receiving a set of results based on the performance of the operation.

Executable instructions for performing these functions are, optionally, included in a non-transitory computer readable storage medium or other computer program product configured for execution by one or more processors. Moreover, details of one or more examples, implementations, and/or embodiments are set forth in the accompanying drawings and the description below. Other components, features, aspects, and potential advantages will be apparent from the description and drawings, and from the claims.

BRIEF DESCRIPTION OF THE FIGURES

For a better understanding of the various described embodiments, reference should be made to the Detailed Description below in conjunction with the following figures in which like reference numerals refer to corresponding parts throughout the figures.

DETAILED DESCRIPTION

Figure 1:
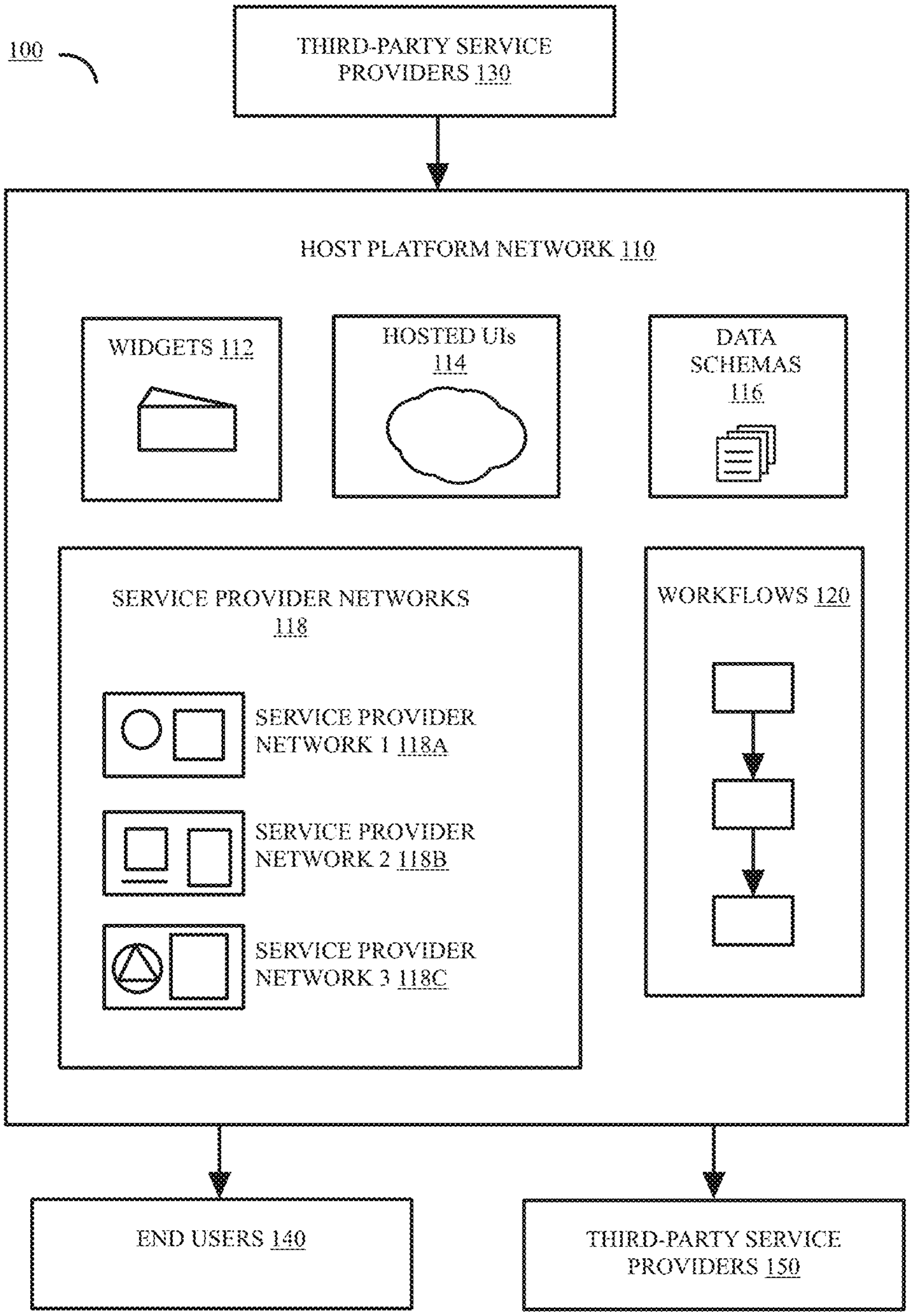
FIG. 1 is a block diagram illustrating the logical relationship between different entities that and components associated with a network ecosystem, in accordance with one or more embodiments.

The detailed description described below describes various examples with reference to the accompanying drawings. Some, but not all, examples are shown and described herein. Indeed, the examples can take many different forms and/or be augmented in many different ways. Accordingly, this disclosure should not be construed as limited to the examples set forth herein. Rather, these examples are provided so that this disclosure will satisfy applicable legal requirements.

Businesses today rely on software tools (e.g., applications, components, plug-ins, and/or the like) to run aspects of their operations. Such software tools are typically sourced by a group of software developers and maintained by a business or the group of software developers. However, a single software tool from a single group of software developers is rarely sufficient to perform all the functions needed by the business or its end users. It may be possible to combine third-party extensions, plug-ins, components, or ancillary software, but doing so can be labor intensive, complicated, and/or inefficient. Therefore, interoperability and/or integration are concerns for businesses because they provide user experiences for accessing shared data, automating processes, and additional functionalities that may not be provided by a single application. Poor interoperability and/or integration can lead to errors, a need for manual intervention, inefficiencies, delay, increased financial expenditure, and poor experience for the business's users (e.g., for a business user or customer if a portion of the software tool is part of a digital storefront).

Interoperability and integration are not the only factors that software tool users must consider. The security and/or privacy of business users' data (including customer data) is often another concern. Exposure of a business' data can result in financial consequences due to fraud or result in damage to customer relationships. Such data can include business information, information concerning one or more users of the business, payment information, account information, usage information, etc.). With software-as-a-service and cloud-based computing gaining widespread acceptance, much of a user's data can be transmitted between many locations and/or entities and stored remotely. As the number of software tools increases, particularly where each is managed by a different third-party provider, the number of entities that must be trusted to handle a business' data increases and the additional increase in the number of data exchanges leads to added security and/or privacy risks.

Therefore, demand exists for an ecosystem that allows businesses, applications, and functional services to integrate seamlessly with each other and/or to maintain better user experience across many different deployments. This can ensure the minimal and secure exchanging of (and/or access to) underlying sensitive data, such as business data and/or personal data associated with the business' customers.

The ecosystem can be built around functionality provided by a host platform that is associated with a trusted entity. In some embodiments, one or more resources of the host platform handles storage of data for processing by third-party applications, provides security and permissions-based access control to such data, and/or provides and maintains software development tools that enable third-party developers to develop applications that are compatible with the ecosystem. These software development tools can include software development kits (SDKs), application programming interfaces (APIs), data schemas, custom objects, software components, libraries, functions, routines, etc. that enable creation of modular applications that can work together. For example, a set of data sourced from one third-party entity can be used by application components of different entities (e.g., different third parties or the host platform). This is possible because of, for example, the host platform providing one or more data schemas that define how metadata is defined so that application components from different platforms can properly handle and/or process the set of data.

For such an ecosystem to be accessible to third-party developers (e.g., third-party service providers), mechanisms can exist that enable third parties to develop software tools that are compatible with the ecosystem and maintain the assurances regarding integration, user experience, and/or data integrity. A third-party developer may want to integrate their current application with other components, workflow steps, applications, and/or services from other third-parties or the host platform. Rather than having to look in lots of places or integrate all these pieces themselves via APIs, etc., the ecosystem can allow the third-party developer to go to a host platform network that exposes available integration options. The host platform network can allow third parties to set up their own networks (also referred to as "network-as-a-service") where another third-party developer (or other user) can find relevant components that can be integrated with a target application. A third-party network can be a third-party customized and/or curated version of the host platform network. Components within the third-party network can include branding and identify information for the third-party even though it is hosted by the host platform network.

Regardless of whether a network is managed by the host platform or by a third party, an end user sourcing components can know that the ecosystem is taking care of integration and/or data handling. This integration and/or data handling can be achieved due to the APIs, data schemas, and custom objects made available by the host platform. The host platform can also define, confirm, and/or enforce permissions for accessing data (e.g., stored by the host platform) by ecosystem components. For example, an application component for messaging customers can be permitted to access customer contact information but not a business' accounting data, even though both are stored by the host platform and associated with a user of the application component.

An example architecture is described herein for creating and deploying an ecosystem that meets some or all the criteria set forth above. Technical features of the architecture are addressed briefly below. It should be understood that the details discussed below are merely exemplary of architecture for creating and/or deploying an ecosystem that meets some or all the criteria set forth above, and other architectures could be used in addition to and/or in lieu of the architecture discussed below to create and deploy an ecosystem that meets some or all the criteria set forth above.

Various embodiments described herein make reference to one or more of the components of FIG. 1, which is explained in more detail below. FIG. 1 illustrates an example block diagram 100. The components illustrated therein can perform, alone or in any combination, one or more processes for implementing one or more aspects of an application exchange ecosystem that can enable one or more of the features described herein.

FIG. 1 is a block diagram 100 that illustrates the logical relationship between different entities and components associated with an ecosystem for integrating such components with a host platform network, in accordance with one or more embodiments. FIG. 1 includes host platform network 110, representing infrastructure (e.g., hardware and/or software) associated with a host platform that supports the ecosystem. As shown, the host platform network 110 includes one or more widgets 112, one or more hosted user interfaces (UIs) 114, one or more data schemas 116, and one or more workflows 120. In some embodiments, a widget is one or more of an application or an application component. In some embodiments, a hosted user interface (UI) is one or more UI elements provided by and/or managed by the host platform. For example, a hosted UI element can be a pre-made UI element that end users 140 and/or third-party service providers 150 can integrate into their own application. As shown, end users 140 and third-party service providers 150 receive content from host platform network 110. An end user of end users 140 can be a party that uses (e.g., causes download, execution, and/or integration of) a component accessed via network 110 or 118A-118C. A third-party service provider of third-party service provider 150 can be a party that uses (e.g., causes download, execution, and/or integration of) a component accessed through network 110 or 118A-118C into their own application (and can also be considered an end user in some scenarios). In some embodiments, a data schema describes the logical organization of one or more databases. In some embodiments, data schemas support the exchange of data between different applications or components running on the host platform and provides a uniform interface for controlling permissions based on schema (e.g., a shape of the data to be shared). In some embodiments, a workflow describes a set of steps for accomplishing a particular task. For example, these steps can be downloaded (e.g., as widgets, hosted UIs, data schemas) and implemented together on a third-party webpage or host platform. In some embodiments, data schemas also specify the permissions in which a third-party component or application can access data associated with a host or other third party component or application. In some embodiments, data schemas are used to determine data access by various applications on a per-user basis. Depending on the role of the user or organization, a data schema may specify that a second application cannot access data from a first application that has specific access permissions specified.

FIG. 1 additionally depicts service provider networks 118. These service provider networks 118 are networks that are managed by (e.g., created, curated by) one or more third-party service providers. This is the network-as-a-service concept discussed above. For example, a third-party service provider can be a software developer of tax preparation software tools. This software developer creates a tax preparation-related component that is compatible with the ecosystem (e.g., using software development tools provided by the host platform). This ecosystem-compatible component can be offered to end users 140 via the software developer's service provider network (e.g., 118A). An end user (e.g., 140) can also navigate to other service provider networks (e.g., 118B or 118C) to download other components that can be integrated with the tax preparation-related component. For example, the end user can download a business transaction tracking application from network 118B and a real estate expense tracking application component from network 118C. In this example, the business transaction tracking application integrates the tax preparation-related and business transaction tracking components so that data can be shared between them, and their functionality combined.

In some examples, the network-as-a-service offered by the host platform can handle one or more of the following functions: user account management, billing and licensing, and installer activation. User account management can include handling user account information (e.g., logins, account history, etc.). Billing and licensing can include billing users for software licenses, accepting payments, managing licenses and subscriptions, etc. Installer activation can include enabling licensed components accessed through the host platform network, configuring the components to work with the end user's system, connecting the components with other services or applications that the end user wants to integrate with, etc.

FIG. 1 additionally depicts third-party service providers 130 providing content into host platform network 110. Third-party service providers 130 can include the same or different third parties than third-party service providers 150. Third-party service providers 130 include third parties that make contributions to the host platform network 110. These contributions can be one or more widgets 112, one or more hosted UIs 114, one or more data schemas 116, one or more service providers networks 118A-118C, and/or one or more workflows 120. For example, a third-party service provider of third-party service providers 130 can be an entity that developed a single component that is made available to end users 140 and/or to third-party service providers 150 via host platform network 110. A third-party service provider can be a party that includes a component (from another third party) into their own service provider network and offers it to end users for integration with the service provider's application. For example, the third-party that manages network 118B (offering the business transaction tracking application) can also offer the tax preparation-related application component in network 118B. End users looking for a tax software tool compatible with the business transaction tracking application would see the tax preparation-related application component available for retrieval in network 118B.

FIG. 1 depicts service provider networks 118A-118C within host platform network 110. However, this depiction is not intended to be limiting in terms of how any components are stored, managed, etc., but are merely illustrated as logical relationships. In some embodiments, a service provider network is accessible via a host platform network. For example, an end user (e.g., 140) can access service provider network 118A by navigating within host platform network 110. In some embodiments, a service provider network is based on host platform network 110. For example, the service provider network is hosted by a third-party service provider but is built based on components of host platform network 110. In some embodiments, third-party service provider components and applications are hosted by the host platform network and have been verified and approved for submission to the host platform network.

Figure 2:
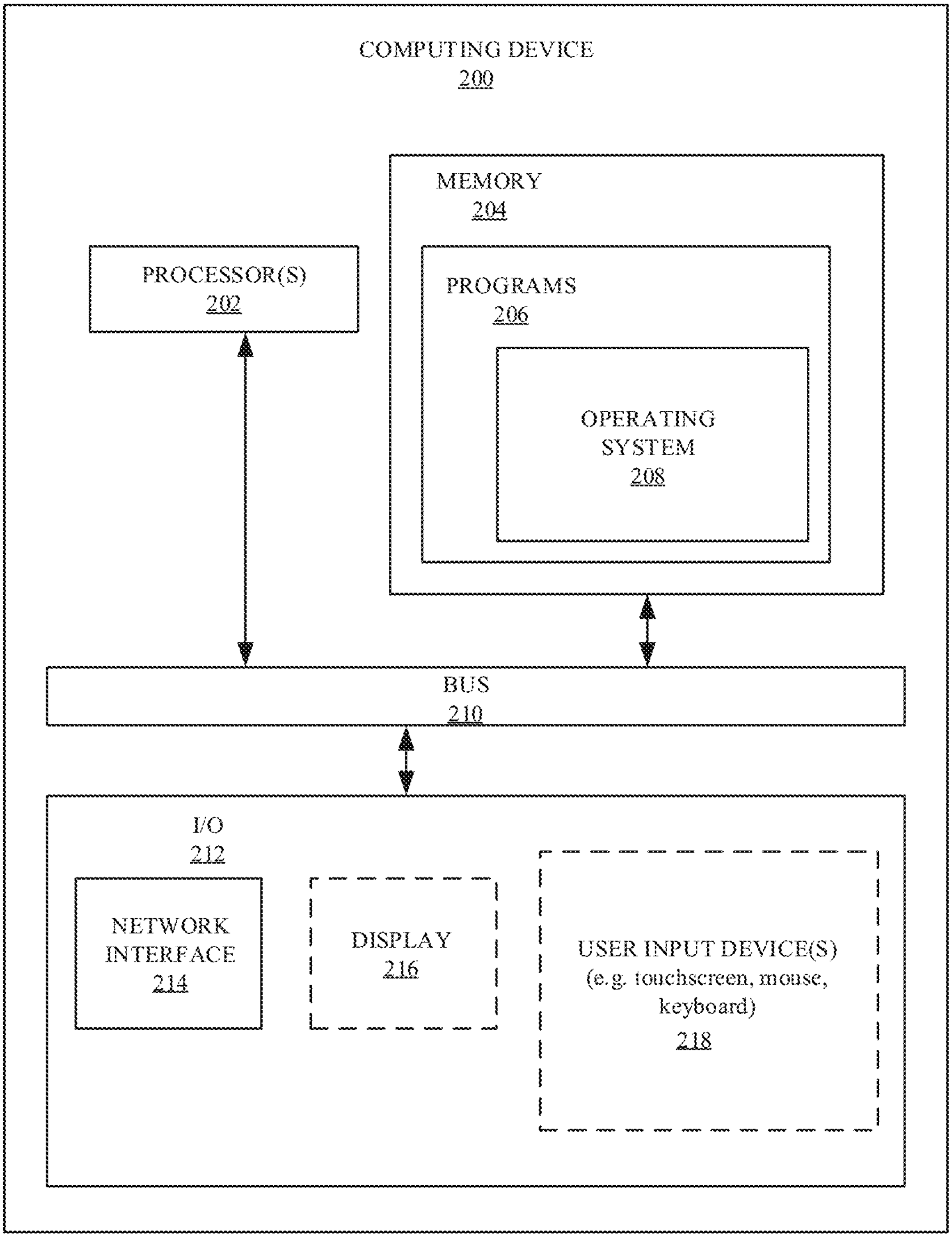
FIG. 2 is a block diagram of a computing device that implements one or more processes in accordance with one or more embodiments described herein.

FIG. 2 illustrates an example computing device 200 (alternatively referred to as computing system 200, computer system 200, system 200, electronic device 200, and/or device 200) that can be used to support and/or implement the architecture and operations in accordance with one or more embodiments described herein. It will be apparent to those of ordinary skill in the art, however, that other alternative systems of various system architectures can also be used. For example, the other alternative systems can be a computing system with fewer, different, and/or additional components than those illustrated in (and/or described in relation to) FIG. 2 or a computing system including one or more devices 200 as illustrated in FIG. 2. In some embodiments, computing device 200 is a general-purpose computer. In some embodiments, computing device 200 is a special purpose (e.g., application specific) hardware device.

Computing device 200 illustrated in FIG. 2 includes one or more bus (or other internal communication component) 210 for communicating information and one or more processors 202 coupled to the bus 210 for processing information. Device 200 includes memory 204 coupled to bus 210. Memory 204 can include random access memory (RAM) or other volatile storage device 204 for storing information and instructions to be executed by one or more processors 202 and/or for storing temporary variables or other intermediate information during execution of instructions by one or more processors 202. Memory 204 can also include non-volatile memory storage, such as read-only memory (ROM) and/or a static storage device for storing static information and instructions executable by processors 202, and one or more data storage devices such as a hard disk (e.g., magnetic disk), flash memory storage, or optical disk and its corresponding disk drive. This data storage device can be coupled to bus 210 for storing information and instructions. For example, memory 204 can store programs 206 in non-volatile memory. In some embodiments, the programs include one or more sets of computer-executable instructions for execution by the one or more processors 202. When ready for execution, the instructions are loaded into volatile memory and passed the processors for execution. The programs 206 can include an operating system 208 for managing the computing device's basic functionality, such as scheduling tasks, executing applications, and controlling peripheral devices. As used herein, the term "program" or "computer program" are considered synonymous with "application," "computer application, or "application component" unless otherwise stated in the context in which the term is used.

Computing device 200 can also include one or more input/output (I/O) components 212. FIG. 2 illustrates several example I/O components grouped together within I/O components 212 for illustration purposes only, and each such component therein does not necessarily need to be located together, or within a part of computing device 200. For example, an I/O component 212 can be an external device coupled to an interface of computing device 200. Computing device 200 can include network interface 214 for handling uplink and/or downlink communications with one or more other devices. The network interface 214 can itself be a communication device and can include any of a number of commercially available networking peripheral devices such as those used for coupling to an Ethernet connection, Wi-Fi connection, 3GPP mobile communication protocol (e.g., 3G, 4G, LTE, 5G, NR, and/or the like), and/or the like, to communicate over the Internet, a wide area network, a local area network, an ad-hoc (device-to-device network), or the like. Network interface 214 can be a modem connection, and/or any other mechanism that provides connectivity between the computing device 200 and one or more other devices. Note that one or more of the components of this system illustrated in FIG. 2 and associated hardware can be used in various embodiments as discussed herein.

Computing device 200 can optionally be coupled to display device 216, such as a light emitting diode (LED) display or a liquid crystal display (LCD) (e.g., coupled through bus 210 for displaying information to a user of computing device 200). Display device 216 can be integrated into computing device 200 (e.g., a touchscreen of a smartphone) or be external to computing device 200 (e.g., an external display coupled via a cable with device 200).

Computing device 200 can optionally include one or more user input device(s) 218, such as an alphanumeric input device (e.g., keyboard), a cursor control or other input signaling device (e.g., a touch-sensitive display (touchscreen), a touchpad, mouse, a trackball, stylus, or cursor direction keys) for controlling cursor movement and/or selection on a user interface displayed using display device 216.

In some embodiments, computing device 200 is a server or system of servers. For example, the server can be a collection of one or more computer hardware machines working together to perform processes and tasks described with respect to computing device 200. Thus, computing device 200 can be considered a logical construct, and references thereto can and should be interpreted as encompassing scope that includes computing device 200 being comprised of one or more computing devices (e.g., as device 200 is described) or several devices that together behave as computing device 200 has been described. As one of skill would appreciate, there is no requirement express or implied herein that the components of computing device 200 be dedicated or physical resources, or that the components must be located physically together. Rather, computing device 200 can be embodied in one or more virtual machines and/or certain functional components of computing device 200 can be remote from other functional components of device 200.

Figure 3:
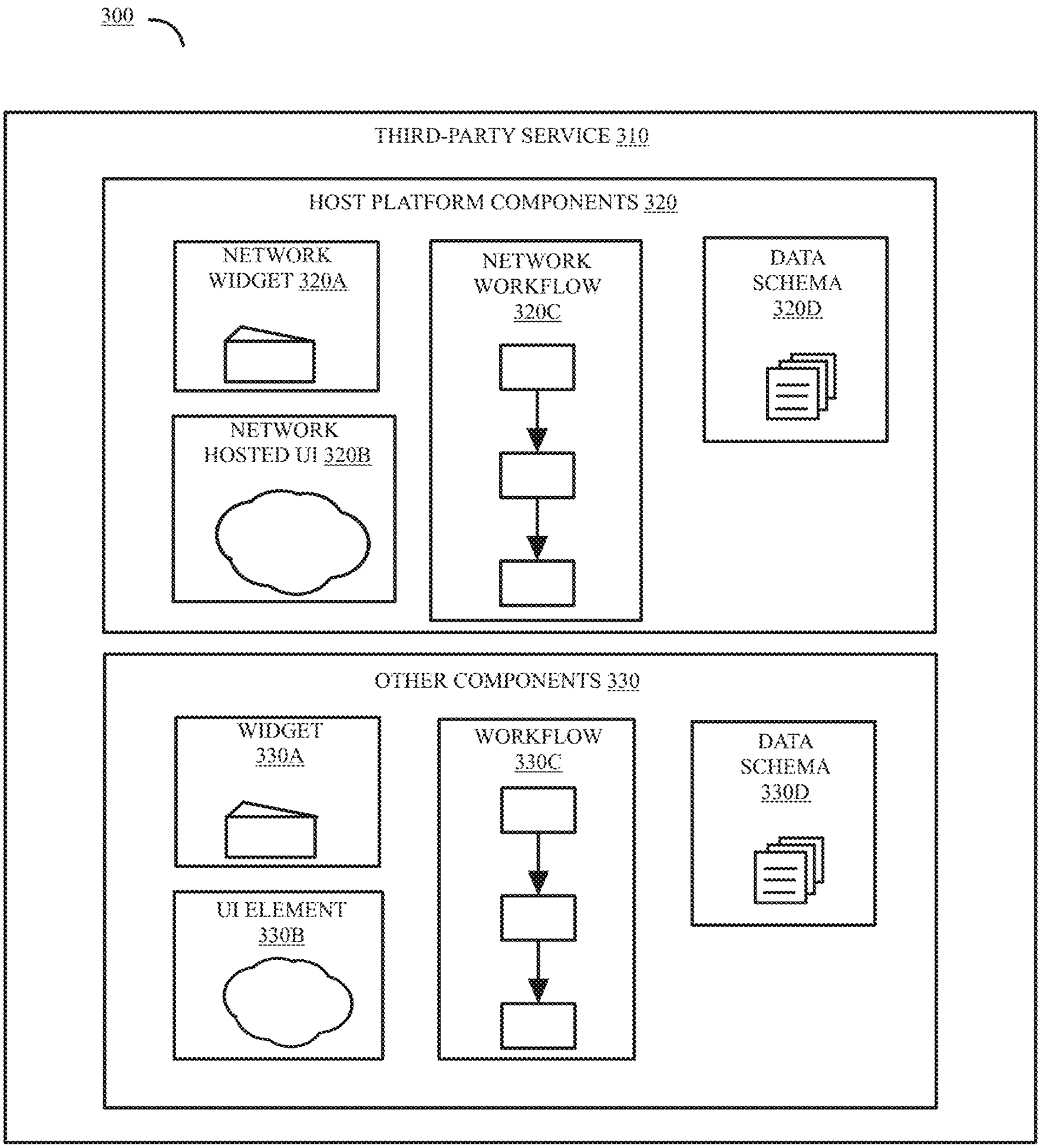
FIG. 3 is a block diagram showing an example service deployed using network components in accordance with one or more embodiments described herein.

FIG. 3 illustrates block diagram 300 illustrating the logical components of an example third-party service 310, in accordance with one or more embodiments. It should be recognized that more or fewer components and/or different components can be included in third-party service 310. A third-party service (e.g., 310) can be an application and/or a webpage. In this example, third-party service 310 is an application that includes both host platform components 320 and other components 330. For example, continuing with the example described with respect to FIG. 1, third-party service 310 is a business transaction tracking application. The business transaction tracking application includes host platform components 320 sourced from host platform sources (e.g., host platform network 110 or service provider networks 118) and integrated into the application and other components 330 sourced from the third-party separate from the host platform sources. In some embodiments, the integration of these components together is due to customization by an end-user. In other embodiments, the integration is performed by a third-party service provider (e.g., 150). Host platform components 320 include network widget 320A, network hosted UI 320B, network workflow 320C, and data schema 320D. For example, widget 320A can be an application component that arranges transaction data for presentation as a spreadsheet. Network hosted UI 320B can be a user interface element displayable by the application for receiving a user input command to refresh the transaction data from a server. Network workflow 320C can be a series of steps (e.g., functions and interfaces) that an end user of the application uses to select a transaction, choose to refund a transaction, receive a verification credential for authorizing the refund, and submit the refund for processing. Data schema 320D can be a data schema that describes how the business tracking application stores transaction data, so that such data can be read by other services.

As mentioned above, the example business transaction tracking application represented by third-party service 310 also includes other service platform components 330 not sourced from host platform sources (e.g., host platform network 110). For example, other service platform components 330 can include components not sourced from the host platform ecosystem, such as those that are developed by the third-party themself or sourced from another third party but not via a service provider network (e.g., 118A-118C).

Other service platform components 330 include widget 330A, UI element 330B, workflow 330C, and data schema 330D. For example, widget 330A can be an application component that adds support for foreign languages in interfaces of the application. UI element 330B can be a user interface element displayable by the application for providing an interface of a search feature. Workflow 330C can be a series of steps (e.g., functions and interfaces) sourced from an open-source repository that an end user of the application uses to select displayed data, take a screenshot by the application, activate an email client, and send the screenshot via the email client. Data schema 330D can be a data schema that describes how the business tracking application stores transaction data, so that such data can be read by other services.

In accordance with some embodiments, the architecture described above can allow developers to build and/or distribute modular applications that are built on a common ecosystem platform. This ecosystem stands in contrast to some legacy models of software tool development and distribution, such as (1) proprietary silos of vertically integrated components that lead to customers being "locked-in" to a set of software that may not meet all of their needs and/or (2) custom development of software solutions for integrating multiple software tools by different developers which requires development time, resources, and ongoing support.

With the above ecosystem framework in mind, attention is now turned towards techniques for deploying an application network, and in particular for creating and using a third-party service provider application network via a host platform and/or a host platform network.

FIGS. 4A-4D illustrate user interfaces associated with creating and using a third-party service provider application network via a host platform, in accordance with one or more embodiments described herein. FIGS. 4A-4D are described below with respect to an example scenario in which a user is a third-party service provider that would like to create a third-party service provider network using a host platform. The third-party service provider is an entity named Bob's Tax, LLC that is a developer of the application named Bob's Tax Software, which is available via the host platform application network. In some embodiments, the user interfaces described below in relation to FIG. 4A-4D are displayed on a device (e.g., that includes one or more features described above with respect to computing device 200) that belongs to a third-party software developer (e.g., third-party service providers 150). In some embodiments, the user interface described below is provided by a server and/or device that corresponds to host platform network 110.

Figure 4A:
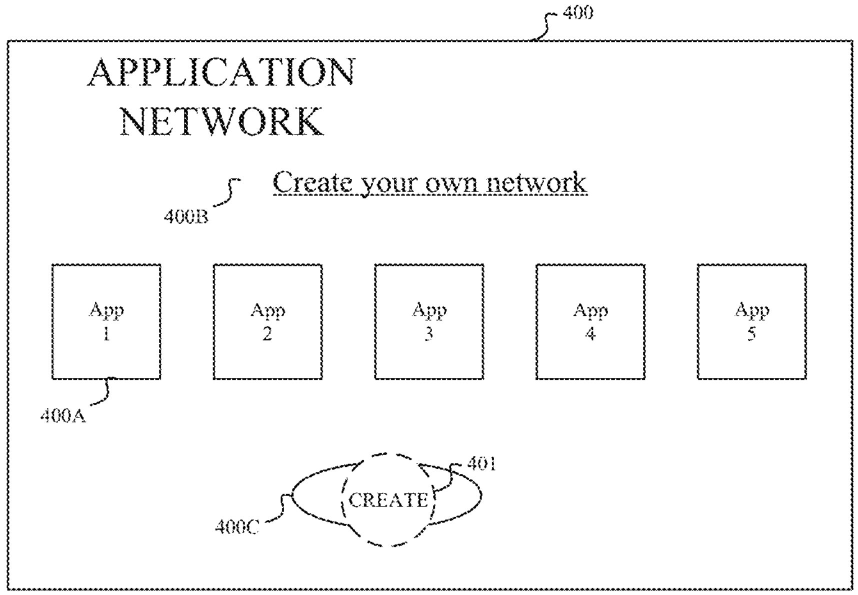
FIGS. 4A-4D illustrate user interfaces associated with creating and using a third-party service provider application network via a host platform.

FIG. 4A illustrates example host platform application network UI 400. Host platform application network UI 400 includes a set of applications 400A available to access by the user that is browsing a host platform application network. FIG. 4A also includes a prompt 400B to "Create your own network" and a create UI element 400C, which is selectable to start a network creation process. Host platform application network UI 400 receives user input 401 representing a tap on create UI element 400C and, in response, causes display of application network creation UI 410 of FIG. 4B.

Figure 4B:
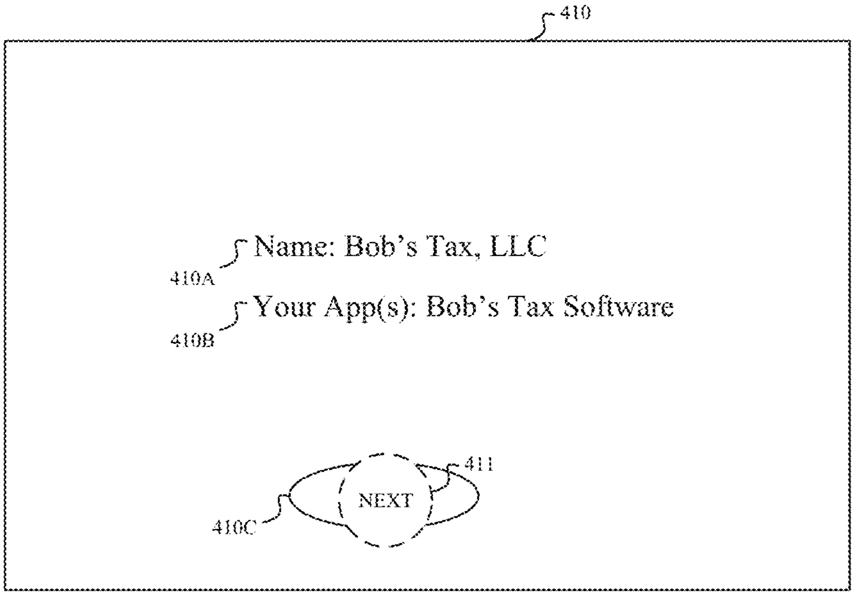

FIG. 4B illustrates example application network creation UI 410. Application network creation UI 410 includes options for customizing one or more aspects of a third-party service provider application network. Identifier field 410A indicates the name of the entity managing the third-party service provider application network that is presented to a user of the network as the manager of the network. In this example, the network is presented as being managed by Bob's Tax, LLC so that users of the resulting network identify Bob's Tax, LLC as the manager of the network (e.g., instead of a host platform, such as host platform network 110). In some embodiments, one or more additional customization options are provided (e.g., styles and/or content). For example, the manager of a network can customize the appearance of their created network (e.g., to match their branding). Application network creation UI 410 also includes application identifier field 410B, allowing the creator of the third-party service provider network to select one or more applications (e.g., one of their own applications) to be a primary application (e.g., on which similar and/or related content will be based, for the third-party service provider network). For example, Bob's Tax Software is selected in FIG. 4B. Selection of the application can affect which complementary components are included in the resulting third-party service provider network. For example, application components that complement (e.g., are similar to and/or related to) tax software will be different than application components that complement an application for messaging customers. FIG. 4B also includes a next UI element 410C that is selectable to progress through a network creation process. Application network creation UI 410 receives user input 411 representing a tap on next UI element 410C, and in response causes display of application network creation UI 420 of FIG. 4C.

Figure 4C:
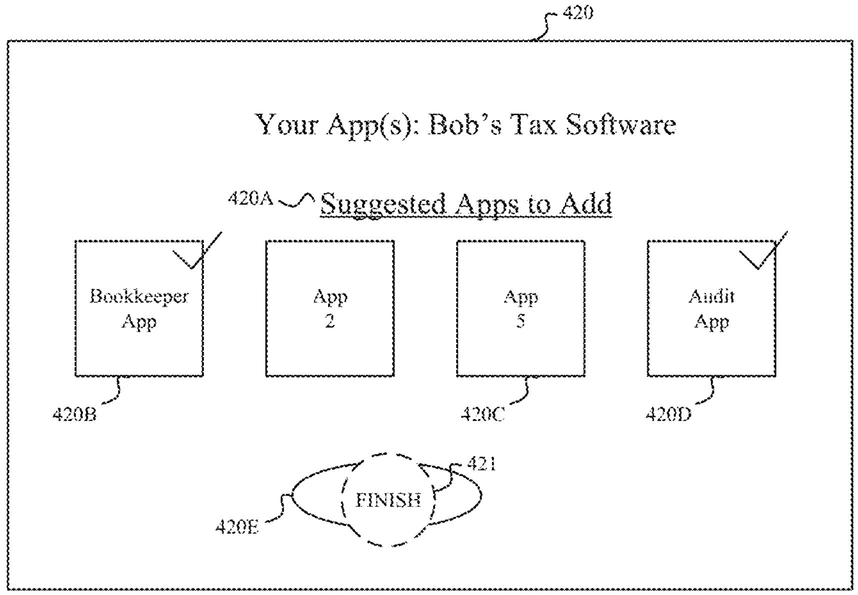

FIG. 4C illustrates example application network creation UI 420. Application network creation UI 420 includes options for customizing one or more aspects of a third-party service provider application network. Suggested applications area 420A prompts the user to add applications to their network ("Suggested Apps to Add") and provides selectable suggestions. In this example, four applications are suggested, including a bookkeeper app 420B and an audit app 420D. Other applications are suggested, including application 420C. In some embodiments, the suggested applications are displayed based on a similarity and/or relation to the primary application. For example, the suggested applications can be based on a similarity to some characteristic, such as type of data used, type of applications (e.g., tax, customer relationship management, and/or accounting), how common it is that the two are integrated by other parties, or the like. In FIG. 4C, user input selection of two applications (e.g., 420B and 420C) is received (indicated by the checkmark on the respective icon). FIG. 4C also includes a finish UI element 420E selectable to complete a network creation process. Application network creation UI 420 receives user input 421 representing a tap on finish UI element 420E, and in response causes creation of a third-party service provider application network (e.g., 430 of FIG. 4D).

Figure 4D:
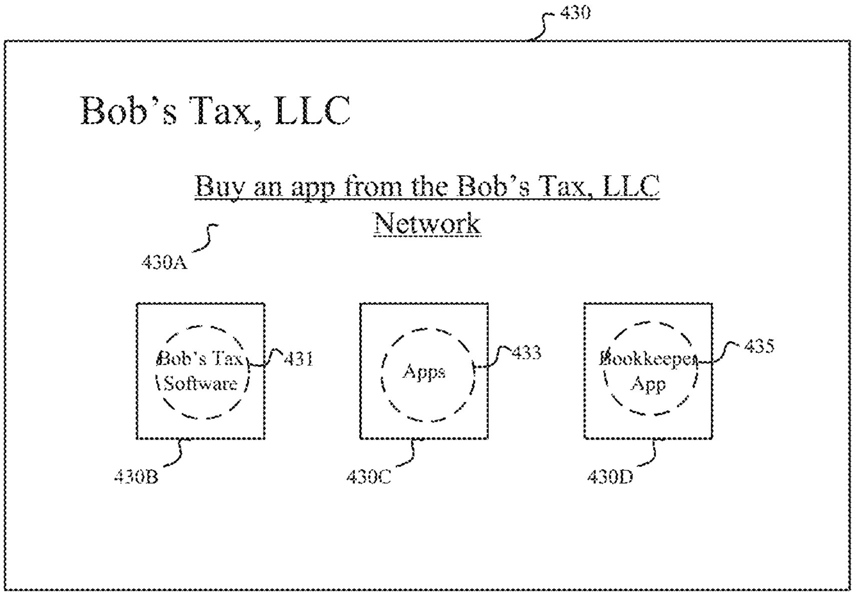

FIG. 4D illustrates example third-party service provider application network UI 430. Third-party service provider application network UI 430 includes an identifier of the third-party service provider, where it states, "Bob's Tax, LLC". Third-party service provider application network UI 430 also includes network applications area 430A that prompts the user to access (e.g., buy, install, download, and/or activate) applications from their network (e.g., "Buy an app from the Bob's Tax, LLC Network"). Network applications area 430A includes several applications that can be selected and accessed through the network, including Bob's Tax Software application 430B, application 430C, and bookkeeper application 430D. In some embodiments, the applications in network applications area 430A are automatically displayed with an appearance and/or style that is similar to or based on a style and/or appearance that is associated with Bob's Tax, LLC, and/or Bob's Tax Software application 430B. At FIG. 4D, user input selection (e.g., 431, 433, or 435) of an application representation (e.g., 430B, 430C, or 430D) causes initiation of a process for providing access to the respective application. The process for providing access can include, for example, one or more of a payment workflow to purchase the selected application, a configuration process for configuring the selected application (and/or another application that will integrate with it), and an installer process for installing the selected application.

Figure 5A:
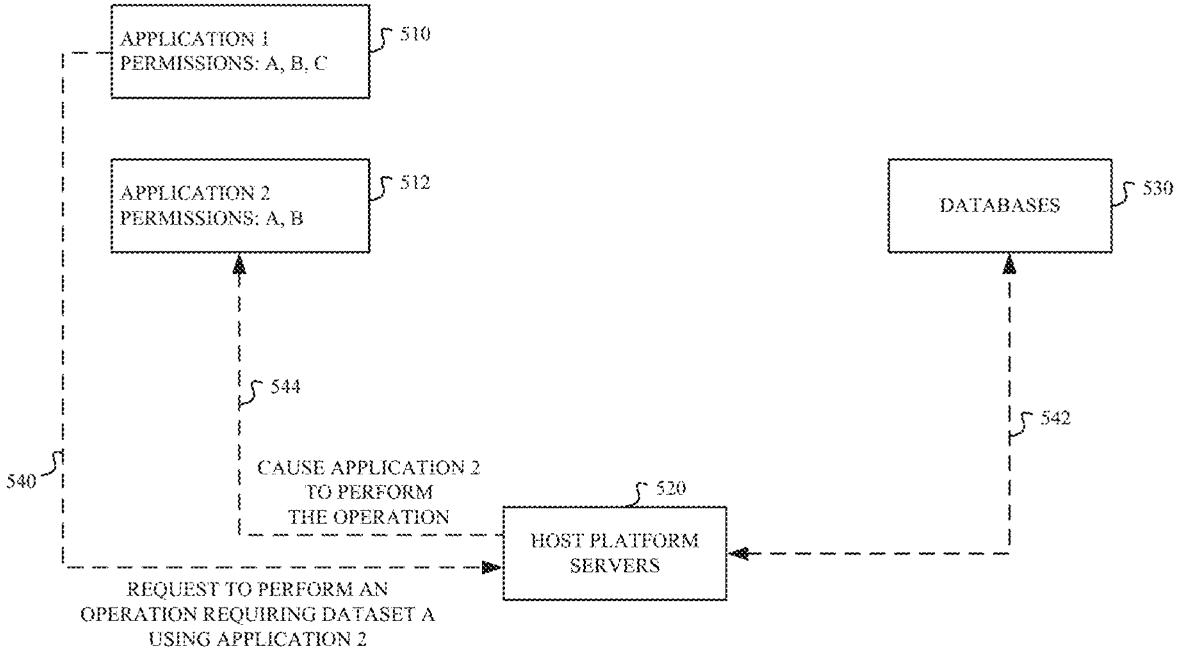
FIGS. 5A-5B illustrate an example communication diagram associated with managing performance of operations.
Figure 5B:
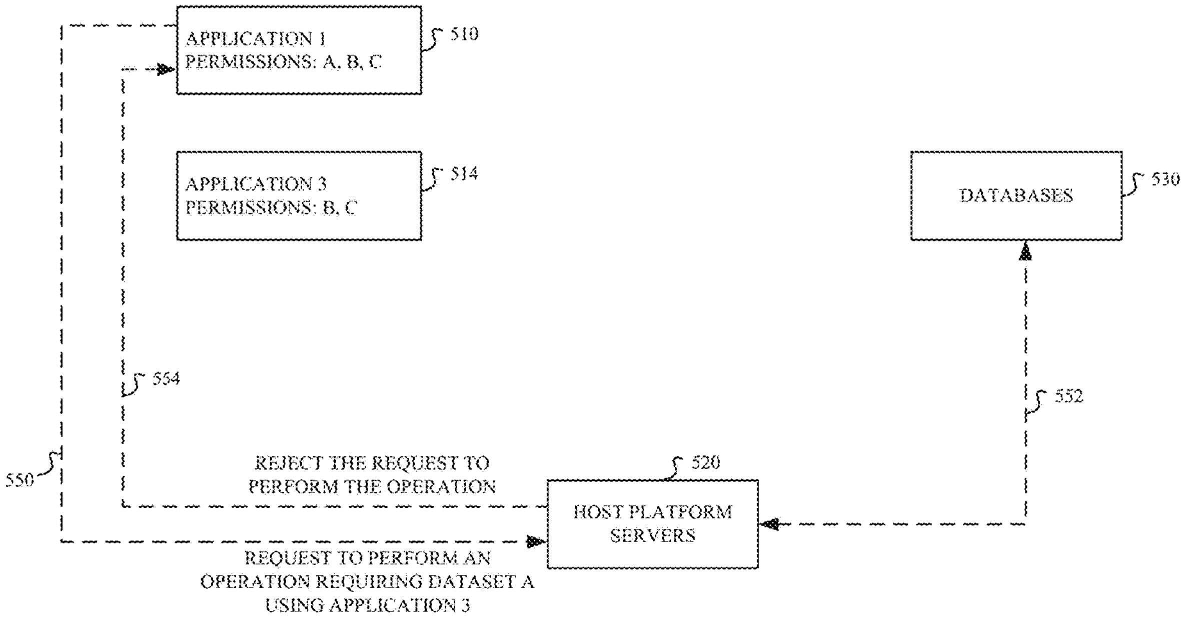

FIGS. 5A-5B illustrate an example communication diagram 500 associated with managing performance of operations. Communication diagram 500 includes an application 510 (e.g., a client application), which operates in conjunction with application 512 (included in FIG. 5A) and application 514 (included in FIG. 5B). In some embodiments, operating in conjunction with includes one application depending on (e.g., requiring input from) another for performing one or more processes. In some embodiments, the application (e.g., 512) is instead a component (e.g., a (non-standalone) application component, a widget, a UI element, a workflow, an extension, a plug-in, or the like). The details of FIGS. 5A-5B occur after a user has installed one or more of the applications discussed in FIGS. 4A-4D. The details of FIGS. 5A-5B further include operations concerning an application that can be utilized by a user, a software developer, and/or a third-party service provider after the application has been installed (e.g., on a user device) or otherwise activated for use by the user.

FIG. 5A illustrates an example where a third-party application has permission to access a dataset from a database and the operation is performed. At FIG. 5A, "Bob's Tax, LLC" owns (and/or created) application 510 (e.g., Bob's Tax Software as discussed above in relation to FIG. 4B) and has permissions to access datasets A, B, and C. A user of Bob's Tax Software wants to add a widget or application integration into Bob's Tax Software, and so they are accessing an application network to access available components. At FIG. 5A, the user of Bob's Tax Software requests to access a collection of applications that includes application 512 having permissions to access datasets A and B (but not dataset C). Application 512 is owned by John Doe's Accounting Company, where John Doe's Accounting Company is not associated with Bob's Tax, LLC (e.g., is a third-party with respect to Bob's Tax, LLC). In some embodiments, application 510 and application 512 have respective associated data schemas that dictate access permissions and how data should be formatted so that data requests between applications are compatible. In some embodiments, data schemas for each corresponding application dictate how data should be stored, whether by the host platform servers, host databases, or proprietary databases. In some embodiments, the corresponding third-party entities that create the applications determine which data schemas are associated with its applications.

When making the request, the user of Bob's Tax Software sends the request to host platform servers 520 to access a collection of applications that includes application 512. Host platform servers 520 can include one or more features as described above with respect to computing device 200. Host platform servers 520 are in communication with databases 530, which include datasets A, B, and C. In addition, host platform servers 520 control access to datasets A, B, and C, which are stored in databases 530.

After sending the request to access the collection of applications, the user of Bob's Tax Software selects application 512 from the collection of applications that are returned by host platform servers 520. For example, this causes the application 512 to be installed and/or activated for use (e.g., on the same device executing Bob's Tax Software). Subsequent to such installation, and upon an event (e.g., user action) invoking a feature of application 512, application 512 sends a request to perform an operation (e.g., using customer data associated with (e.g., owned by, stored by, and/or corresponding to) application 510) to host platform servers 520 (e.g., as indicated by request 540). In some embodiments, application 510 provides approval for application 512's request (e.g., allows it to proceed to the host platform using the customer data associated with application 510) (e.g., approval can be based on a permissions setting associated with one or more of the user, application 510 and/or application 512).

In the embodiment described in relation to FIG. 5A, the user of Bob's Tax Software would like to include an operation that can be performed by application 512 into application 510 (e.g., Bob's Tax Software). However, instead of writing computer code to perform the operation, the user of Bob's Tax Software wishes to leverage application 512 (e.g., developed by a third-party developer and/or by the host platform) to enable the operation to be performed as a part of application 510 in order to save time, cost, and effort. The operation using application 512 requires access to dataset A. Upon receiving the request to perform the operation using application 512, host platform servers 520 determine that both application 510 (and/or the user of Bob's Tax Software) and application 512 have permission to access dataset A (e.g., at step 542) and, based on this determination, causes application 512 to perform the operation using dataset A (e.g., as indicated by step 544). In some embodiments, host platform servers 520 communicate with databases 530 to determine that an application has permission to access a particular dataset in database 530. In some embodiments, host platform servers communicate with databases 530 to retrieve the particular dataset (e.g., which is then provided to the application 510 and/or 512). In some embodiments, host platform servers approve application 510 and/or 512 to communicate with databases 530 to retrieve the particular dataset. In some embodiments, the host platform servers provide the particular dataset to application 510, which then provides access to this data to application 512. In some embodiments, a host platform server is able to determine which applications have the appropriate access permissions based on data schemas associated with each application. In some embodiments, data schemas also dictate which data store each application's data may be stored in. In some embodiments, data from a third-party application may be stored in a host owned database. In some embodiments, third-party application data may be stored in a separate database owned by the third-party. In some embodiments, host platform servers 520 do not communicate with databases 530 to determine that an application has permissions to access a particular data in database 530.

In some embodiments, after causing application 512 to perform the operation, host platform servers 520 receives a set of results based on application 512 performing of the operation and returns the set of results to the user of Bob's Tax Software and/or application 510. In some embodiments, when a user is interacting with application 510, there is a seamless experience such that there is no additional interface indication that application 512 is performing the operation instead of application 510. In some embodiments, the operation performed by application 512 is an operation that is not performed by application 510. In some embodiments, the operation performed by application 512 is performed at (and/or executed on) a server that is associated with (e.g., belongs to) its respective developer (e.g., John Doe's Accounting Company). In other embodiments, the operation performed by application 512 is performed at host platform servers 520. In some embodiments, if either the user of Bob's Tax Software or application 512 does not have permission to access data set A, host platform servers 520 would not cause application 512 to perform the operation using dataset A because both the requesting entity (e.g., the user of Bob's Tax Software and/or application 510) and the target entity (e.g., "John Doe's Accounting Company" and/or application 512) need permission to access dataset A in order for application 512 to be caused to perform an operation using dataset A. In such embodiments, application 510 (or the user of Bob's Tax Software) is not able to leverage application 512 to perform operations for application 510. In some embodiments, an administrator or user may be notified that a request to access dataset A was denied and the administrator or user may approve or alter the access rights for dataset A.

FIG. 5B illustrates an example where a third-party application does not have permission to access a dataset from a database and the operation is not performed. At FIG. 5B, "Bob's Tax, LLC owns (and/or created) application 510 (e.g., Bob's Tax Software as discussed above in relation to FIG. 4B) having permissions to access datasets A, B, and C. At FIG. 5B, the user of Bob's Tax Software requests to access a collection of applications that includes application 514 having permissions to access datasets B and C (but not dataset A). Application 514 is owned by Jane's Elite Auditing Group, where Jane's Elite Auditing Group is not associated with Bob's Tax, LLC (e.g., is a third-party with respect to Bob's Tax, LLC). Regarding the request, the user of Bob's Tax Software sends the request to access a collection of applications that includes application 514 to host platform servers 520. In some embodiments, the collection of applications includes application 512 of FIG. 5A and application 514 of FIG. B. At FIG. 5B, host platform servers 520 is in communication with databases 530, which include datasets A, B, and C and controls access to datasets A, B, and C, as described above in relation to 5A.

After sending the request, the user of Bob's Tax Software (e.g., a user of an account associated with the software) selects application 514 from the collection of applications (e.g., indications thereof) that are returned by host platform servers 520. For example, this causes the application 514 to be installed and/or activated for use (e.g., on the same device executing Bob's Tax Software). Subsequent to such installation, and upon the user invoking a feature of application 514, application 514 sends a request to perform an operation to host platform servers 520 (e.g., as indicated by step 550) that requires access to dataset A. Upon receiving the request to perform the operation using application 514, host platform servers 520 determine that application 514 does not have permission to access dataset A (e.g., as indicated by step 554) and, based on this determination, sends a rejection to the request to perform the operation to application 510 (and/or the user of Bob's Tax Software) (e.g., as indicated by step 554) and does not cause application 514 to perform the operating using dataset A (e.g., the request to perform operation is unsuccessful). It should be understood that, while FIGS. 5A-5B and the associated description discuss performance and integration of one application into another application, similar techniques discussed in relation to FIGS. 5A-5B could also apply to performance and integration of one or more components into one or more other components, such as workflows, steps of workflows, user interface extensions, and/or a portion of the application. For example, such components are not limited to being full end-to-end applications, but can be user interfaces made by third-parties, workflows, and the like.

Figure 6:
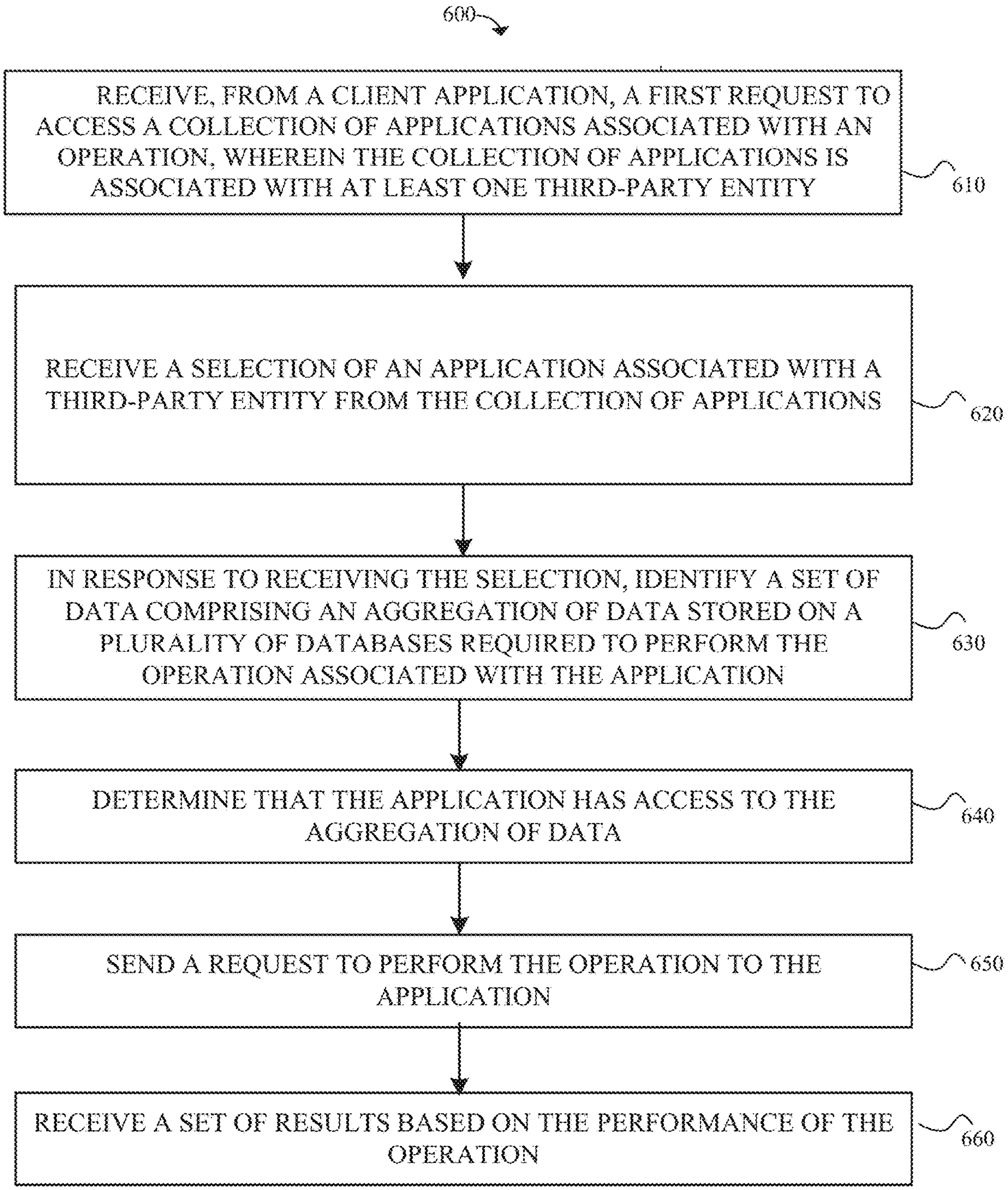
FIG. 6 illustrates a flow diagram illustrating a method for managing the performance of an operation corresponding to an application in a collection of applications in accordance with one or more embodiments described herein.

FIG. 6 is a flow diagram illustrating a method for managing the performance of an operation corresponding to an application in a collection of applications in accordance with one or more embodiments described herein. In some embodiments, the method is performed by a computer system (e.g., computing device 200, host platform servers

520) (e.g., one or more of 402-408) (e.g., a server, a personal computing device, and/or a mobile device).

At block 610, the computer system receives, from a client application (e.g., 510), a first request to access a collection of applications (e.g., 430A) associated with an operation, wherein the collection of applications is associated with at least one third-party entity (e.g., such as John Doe's Accounting Company or Jane's Elite Auditing Group, described above). In some embodiments, the at least one third-party entity is a third-party entity to the computer system. In some embodiments, the at least one third-party entity is a third-party entity to the client application and/or is not a creator and/or associated with the client application.

At block 620, the computer system receives a selection of an application (e.g., 510, 512) associated with a third-party entity from the collection of applications. In some embodiments, the collection of applications includes components of applications (e.g., hosted UIs, widgets, workflows). In some embodiments, the computer system determines whether the application has sufficient access rights (e.g., to particular data) before allowing it to be selected, installed, and/or otherwise made accessible to the client application.

At block 630, the computer system, in response to receiving the selection (e.g., request 540), identifies a set of data (e.g., dataset A described with respect to FIGS. 5A-5B) comprising an aggregation of data stored on a plurality of databases (e.g., 530) required to perform the operation associated with the application. In some embodiments, the operation is an operation performed by a second application (e.g., 510, 512, 514), different than the application. In some embodiments, the plurality of databases includes a first database storing first data for a client application (e.g., 510), a second database storing second data for an application platform (e.g., 512), a third database storing third data for a third-party application platform (e.g., 514), and a fourth database storing fourth data for the third-party application. In some embodiments, the data includes personally identifiable information (PII). The computer system can maintain safeguards to ensure that such data remains secure, and that access is limited only to authorized users, devices, systems, servers, and/or components (e.g., applications, application components, widgets, UI elements, workflows, or the like). For example, each entity, associated device, and component can be required to have appropriate permissions (also referred to as access rights) to the data before being allowed to retrieve, access, or otherwise handle such data. Additional security measures such as authentication and/or encryption can be required by the computer system (or other component of the ecosystem) for operations involving handling or exchanging such data.

At block 640, the computer system determines that the application has access to the aggregation of data. For example, in FIG. 5A, application 512 has access to dataset A. In some embodiments, determining that the application has access includes determining whether the application and/or an entity associated with the application has permissions to access the aggregation of data, permissions to access a database in which the aggregation of data is stored, and/or permissions to access each dataset in the aggregation of data.

At block 650, the computer system sends a request (e.g., 544) to perform the operation to the application. In some embodiments, the computer system sends the request to perform the operation to the application after (and/or in response to) determining that the application has access to the aggregation of data.

At block 660, the computer system receives a set of results based on the performance of the operation. In some embodiments, the application executes on a third-party platform (e.g., server associated with the third party). In some embodiments, in response to determining that the application does not have access to the aggregation of data, preventing the request to be sent to the application (e.g., 552).

In some embodiments, the compute system determines a first set of permissions required to perform the operation; determines a second set of permissions of the client application corresponding to the set of data; determines a third set of permissions of the third-party application corresponding to the set of data; and determines that the second set of permissions and the third set of permissions includes the first set of permissions required to perform the operation.

In some embodiments, the computer system receives, from a client application executing on a client device, a request for a third-party application to perform an operation, the third-party application provided by a third-party application marketplace (e.g., network). In some embodiments, based on the operation, the compute system determines a set of data from a plurality of databases required to perform the operation, the set of data comprising an aggregation of different data stored on each database from the plurality of databases. In some embodiments, the computer system determines that at least the client application and the third-party application have sufficient permissions to perform the operation involving the set of data. In some embodiments, the computer system sends, using a secure channel (e.g., authentication between parties and protected by a private key), the request to the third-party application. In some embodiments, the computer system receives, from the secure channel, a set of results after the third-party application performs the operation. In some embodiments, the computer system sends, to the client device, the set of results to the client application. In some embodiments, the client application utilizes the third-party application to perform additional functionality not provided by the client application.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described to best explain the principles and practical applications of the various embodiments, to thereby enable others skilled in the art to best utilize the various embodiments with various modifications as may be suited to the particular use contemplated.

What is claimed is:

1. A computer system, comprising: one or more processors; and memory storing one or more programs configured to be executed by the one or more processors, the one or more programs including instructions for:

generating a suggested collection of applications based at least in part on a first application selected by a client device;

receiving, from the client device, a second selection of a second application from the suggested collection of applications;

integrating the first application and second application with a client application on the computer system;

receiving, from the client application, a request to perform an operation on the client application, wherein the operation is performed with respect to a database separate from the client device, wherein the first application corresponds to a first set of permissions with respect to the database, the second application corresponds to a second set of permissions with respect to the database, the client application is associated with a third set of permissions with respect to the database, and the operation requires a fourth set of permission;

selecting at least one of the first application or the second application of the client application to perform the operation based on a determination that at least one of the first set of permissions or the second set of permissions, collectively with the third set of permissions, includes the fourth set of permissions;

sending a request to perform the operation to the selected first or second application; and receiving a set of results based on performance of the operation.

2. The computer system of claim 1, wherein the one or more programs include instructions for:

providing the set of results to the client application.

3. The computer system of claim 1, wherein the suggested collection of applications includes applications that share, with the first application, at least one of a data schema, application type, or history of integration.

4. The computer system of claim 1, wherein the one or more programs include instructions for:

for a second request to perform a second operation requiring a fifth set of permissions, in response to a determination that the first set of permissions and the second set of permissions do not include the fifth set of permissions, preventing the second request from being sent.

5. The computer system of claim 1, wherein at least one of the first application or the second application execute on a third-party platform.

6. A non-transitory computer-readable storage medium storing one or more programs configured to be executed by one or more processors of a computer system, the one or more programs including instructions for:

generating a suggested collection of applications based at least in part on a first application selected by a client device;

receiving, from the client device, a second selection of a second application from the suggested collection of applications;

integrating the first application and second application with a client application on the computer system;

receiving, from the client application, a request to perform an operation on the client application, wherein the operation is performed with respect to a database separate from the client device, wherein the first application corresponds to a first set of permissions with respect to the database, the second application corresponds to a second set of permissions with respect to the database, the client application is associated with a third set of permissions with respect to the database, and the operation requires a fourth set of permission;

selecting at least one of the first application or the second application of the client application to perform the operation based on a determination that at least one of the first set of permissions or the second set of permissions, collectively with the third set of permissions, includes the fourth set of permissions;

sending a request to perform the operation to the selected first or second application; and receiving a set of results based on performance of the operation.

7. The non-transitory computer-readable storage medium of claim 6, wherein the one or more programs include instructions for:

providing the set of results to the client application.

8. The non-transitory computer-readable storage medium of claim 6, wherein the suggested collection of applications includes applications that share, with the first application, at least one of a data schema, application type, or history of integration.

9. The non-transitory computer-readable storage medium of claim 8, wherein the one or more programs include instructions for:

for a second request to perform a second operation requiring a fifth set of permissions, in response to a determination that the first set of permissions and the second set of permissions do not include the fifth set of permissions, preventing the second request from being sent.

10. A method, comprising:

generating, by a host platform, a suggested collection of applications based at least in part on a first application selected by a client device;

receiving, by the host platform and from the client device, a second selection of a second application from the suggested collection of applications;

integrating, by the host platform, the first application and second application with a client application on the host platform;

receiving, by the host platform and from the client application, a request to perform an operation on the client application, wherein the operation is performed with respect to a database separate from the client device, wherein the first application corresponds to a first set of permissions with respect to the database, the second application corresponds to a second set of permissions with respect to the database, the client application is associated with a third set of permissions with respect to the database, and the operation requires a fourth set of permission;

selecting, by the host platform, at least one of the first application or the second application of the client application to perform the operation based on a determination that at least one of the first set of permissions or the second set of permissions, collectively with the third set of permissions, includes the fourth set of permissions;

sending a request to perform the operation to the selected first or second application; and receiving a set of results based on performance of the operation.

11. The method of claim 10, further comprising: providing the set of results to the client application.

12. The method of claim 10, wherein the suggested collection of applications includes applications that share, with the first application, at least one of a data schema, application type, or history of integration.

13. The method of claim 10, further comprising:

for a second request to perform a second operation requiring a fifth set of permissions, in response to a determination that the first set of permissions and the second set of permissions do not include the fifth set of permissions, preventing the second request from being sent.

14. The computer system of claim 1, wherein at least one of the first application and the second application is provided by a third-party application provider.

15. The computer system of claim 1, wherein the first set of permissions and the second set of permissions are dependent on role of a user or organization associated with the client device.

16. The non-transitory computer-readable storage medium of claim 6, wherein at least one of the first application and the second application is provided by a third-party application provider.

17. The non-transitory computer-readable storage medium of claim 6, wherein at least one of the first application or the second application execute on a third-party platform.

18. The method of claim 10, wherein at least one of the first application and the second application is provided by a third-party application provider.

19. The method of claim 10, wherein at least one of the first application or the second application execute on a third-party platform.

20. The method of claim 10, wherein the first set of permissions and the second set of permissions are dependent on role of a user or organization associated with the client device.

* * * * *